(12) United States Patent  (10) Patent No.: US 9,114,703 B1
Bennett et al.  (45) Date of Patent: Aug. 25, 2015

(54) MODULAR TRANSMISSION ASSEMBLY

(75) Inventors: Michael L. Bennett, Sullivan, IL (US);
Michael W. Taylor, Sullivan, IL (US)

(73) Assignee: Hydro-Gear Limited Partnership,
Sullivan, IL (US)

( * ) Notice: Subject to any disclaimer, the term of this patent is extended or adjusted under 35 U.S.C. 154(b) by 1237 days.

(21) Appl. No.: 12/765,559

(22) Filed: Apr. 22, 2010

Related U.S. Application Data

(60) Provisional application No. 61/172,611, filed on Apr. 24, 2009.

(51) Int. Cl.
*B60K 17/10* (2006.01)
*F16H 61/439* (2010.01)
*F16H 39/14* (2006.01)

(52) U.S. Cl.
CPC .............. *B60K 17/10* (2013.01); *F16H 39/14* (2013.01); *F16H 61/439* (2013.01)

(58) Field of Classification Search
CPC ........ B60K 17/10; F16H 39/14; F16H 61/439
USPC ............................ 180/6.48; 60/484, 487, 488
See application file for complete search history.

(56) References Cited

U.S. PATENT DOCUMENTS

| | | | |
|---|---|---|---|
| 3,459,273 A | 8/1969 | Leinhauser et al. | |
| 3,469,381 A * | 9/1969 | Burrough et al. | 56/209 |
| 3,563,109 A * | 2/1971 | Glass et al. | 74/470 |
| 3,866,700 A | 2/1975 | Bauer | |
| 4,773,494 A * | 9/1988 | Anderson | 180/6.48 |
| 4,920,733 A * | 5/1990 | Berrios | 56/10.9 |
| 4,967,543 A * | 11/1990 | Scag et al. | 56/10.8 |
| 5,010,733 A | 4/1991 | Johnson | |
| 5,339,631 A * | 8/1994 | Ohashi | 60/487 |
| 6,029,779 A | 2/2000 | Kunz | |
| 6,332,393 B1 | 12/2001 | Trimble | |
| 6,425,244 B1 * | 7/2002 | Ohashi et al. | 60/464 |
| 6,662,895 B1 * | 12/2003 | Bednar | 180/308 |
| 6,705,840 B1 | 3/2004 | Hauser | |
| 6,782,797 B1 * | 8/2004 | Brandenburg et al. | 92/12.2 |
| 6,973,783 B1 * | 12/2005 | Hauser et al. | 60/484 |
| 6,997,839 B1 * | 2/2006 | Langenfeld et al. | 475/83 |
| 7,040,445 B2 * | 5/2006 | Ishii et al. | 180/307 |
| 7,056,101 B1 | 6/2006 | Hauser | |
| 7,316,287 B2 * | 1/2008 | Ohashi et al. | 180/307 |

(Continued)

OTHER PUBLICATIONS

Muncie Power Products, Inc., Clutch Pump Installation Instructions, Muncie Power Products Technical Publication IN81-4, Jul. 2002, pp. 1-2.

*Primary Examiner* — Edward Look
*Assistant Examiner* — Michael Quandt
(74) *Attorney, Agent, or Firm* — Neal, Gerber & Eisenberg LLP

(57) ABSTRACT

A modular transmission assembly is disclosed, including a bracket having separate, integrally formed pump and motor mounting areas disposed generally perpendicular to one another, a pump assembly engaged and fastened to the bracket proximate to the pump mounting area, the pump assembly having an end cap secured to a pump housing and having at least two system ports on one side of the end cap, a motor assembly engaged and fastened to the bracket proximate to the motor mounting area, the motor assembly having a front housing with at least two motor system ports and an output shaft and at least two hoses connecting the pump system ports to the motor system parts to form a hydraulic circuit.

17 Claims, 4 Drawing Sheets

(56) References Cited

U.S. PATENT DOCUMENTS

| | | |
|---|---|---|
| 7,640,738 B1 | 1/2010 | Hauser et al. |
| 8,100,204 B2 * | 1/2012 | Dong et al. .................. 180/6.48 |
| 8,196,399 B1 * | 6/2012 | Hauser et al. ................... 60/435 |
| 2002/0178709 A1 * | 12/2002 | Velke et al. ................... 56/10.9 |
| 2006/0039801 A1 | 2/2006 | Dong et al. |
| 2006/0225927 A1 * | 10/2006 | Iwaki et al. ................... 180/6.3 |
| 2006/0272496 A1 * | 12/2006 | Ohashi ........................... 91/472 |
| 2007/0137918 A1 | 6/2007 | Dong |
| 2007/0193264 A1 * | 8/2007 | Dong et al. ..................... 60/487 |
| 2008/0034747 A1 * | 2/2008 | Ohashi ........................... 60/464 |
| 2008/0083580 A1 | 4/2008 | White |
| 2008/0099269 A1 | 5/2008 | Sakikawa |
| 2008/0120974 A1 | 5/2008 | Dong |
| 2008/0310972 A1 | 12/2008 | Dong |
| 2009/0183479 A1 * | 7/2009 | Nicholson et al. ............. 56/14.7 |

* cited by examiner

MODULAR TRANSMISSION ASSEMBLY

CROSS-REFERENCE TO RELATED APPLICATIONS

This application claims priority from U.S. Provisional Application Ser. No. 61/172,611, filed Apr. 24, 2009, which is incorporated herein by reference in its entirety.

FIELD OF THE INVENTION

This invention relates to a modular assembly for a hydraulic transmission, for use in snow throwers, lawn mowers or other self-propelled machines as well as in vehicles such as lawn or garden tractors having a prime mover and at least one such transmission assembly.

A better understanding of the objects, advantages, features, properties and relationships of the invention will be obtained from the following detailed description and accompanying drawings which set forth illustrative embodiments that are indicative of the various ways in which the principles of the invention may be employed.

BACKGROUND OF THE INVENTION

The general design of hydrostatic drive systems for vehicles such as self-propelled mowers and lawn or garden tractors, is known. Integrated hydraulic transmissions in which the pump and motor are enclosed in the same housing and share a common sump and center section have become quite popular. Under certain circumstances, a vehicle manufacturer may be willing to sacrifice the convenience and cost savings offered by an integrated design for the flexibility and easy maintenance offered by separate, but connected hydraulic pumps and motors.

Hydraulic pump and motor combinations without brackets are also known, but these designs are not modular in that the pumps and motors are integrally connected in some fashion, share housings, or are separately connected to a vehicle frame.

Hydraulic pump and motor modules having an end-to-end pump-and-motor design and differential gearing are described in U.S. Pat. Nos. 6,705,840, 7,056,101, and 7,640,738. These designs show multiple pumps and motor in a single module which limits the flexibility of this modular design for a given vehicle design. Thus, an alternative transmission assembly design would be useful to vehicle manufacturers.

SUMMARY OF THE INVENTION

A modular transmission assembly is disclosed, including a bracket comprising a pump mounting area and a motor mounting area, wherein the motor mounting area is integrally formed with and generally perpendicular to the pump mounting area; a pump assembly engaged and fastened to the bracket proximate to the pump mounting area, the pump assembly comprising an end cap secured to a pump housing and having at least two system ports on one side of the end cap; a motor assembly engaged and fastened to the bracket proximate to the motor mounting area, the motor assembly comprising a front housing comprising at least two motor system ports and an output shaft; and at least two hoses, each hose connecting one of the pump system ports to one of the motor system ports, to form a hydraulic circuit.

DETAILED DESCRIPTION OF THE DRAWINGS

Figure 1:
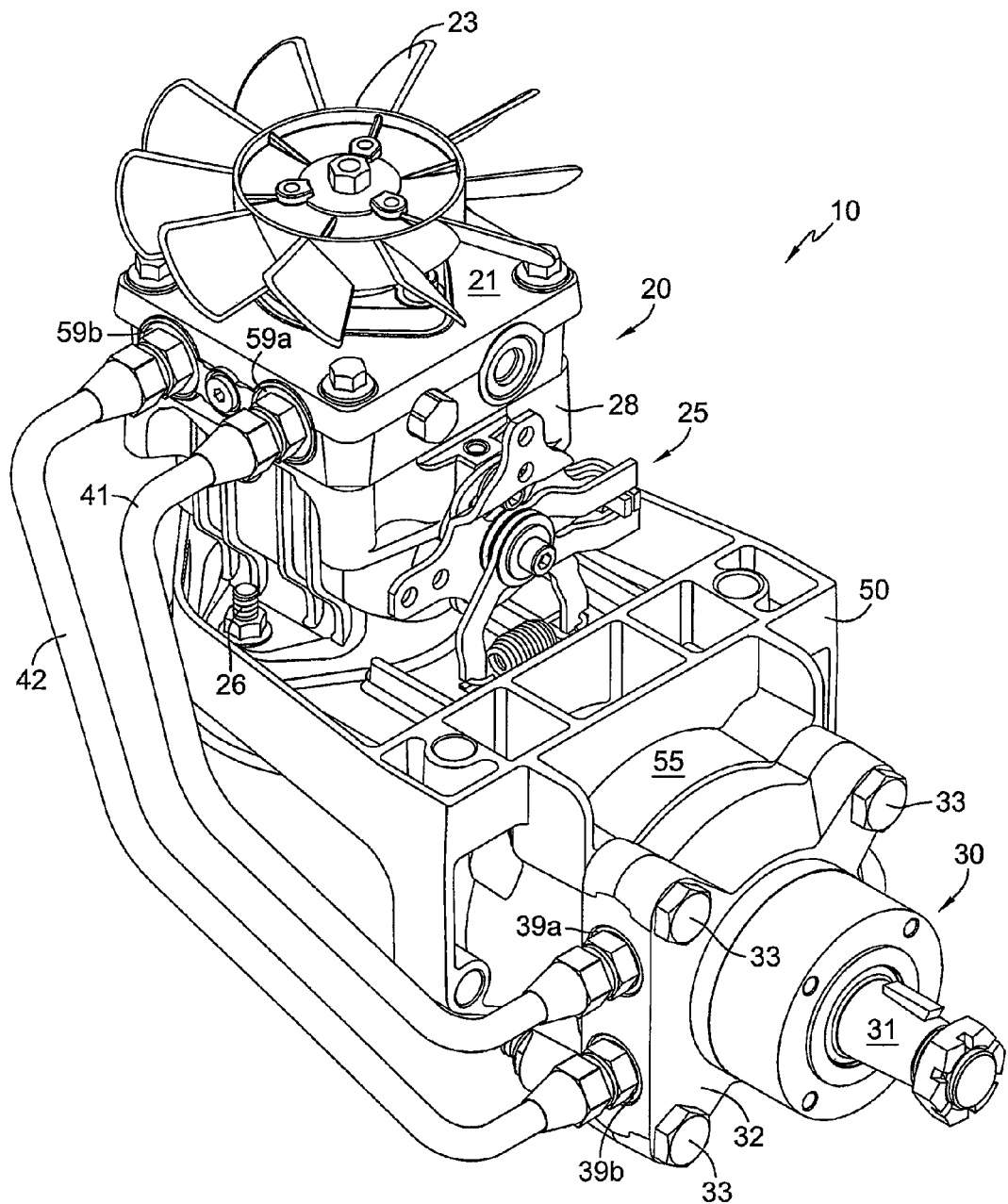
FIG. 1 is a perspective view of an embodiment of the present invention.

The present invention is described herein with respect to an exemplary transmission to be used with a vehicle. It should be noted that in the description and drawings, certain elements that are similar to other elements but used on different sides of the assembly may be labeled using "a" and "b" in addition to the reference numeral where such labeling assists in understanding the disclosure. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Figure 2:
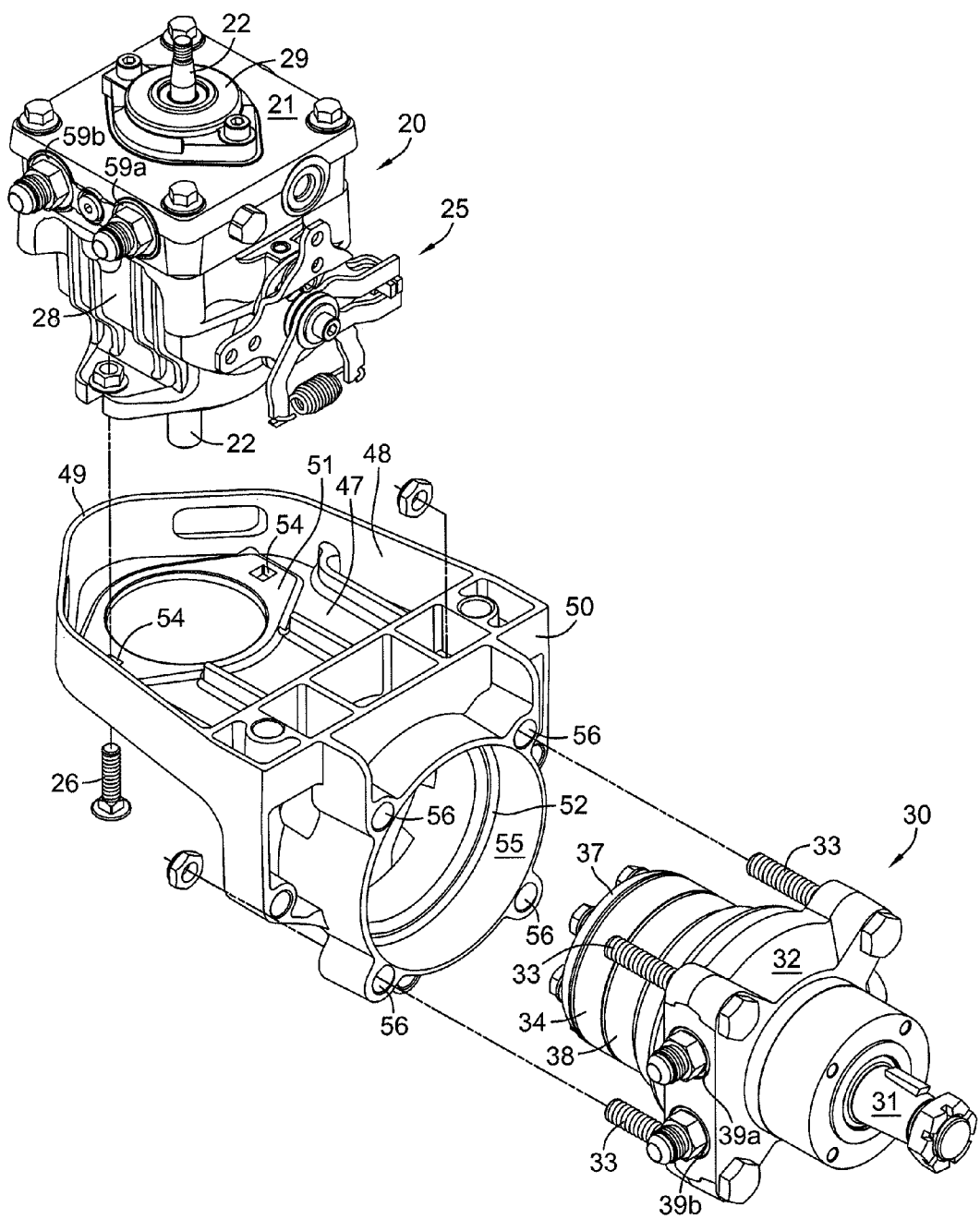
FIG. 2 is a partially-exploded view of the embodiment of the present invention depicted in FIG. 1.
Figure 3:
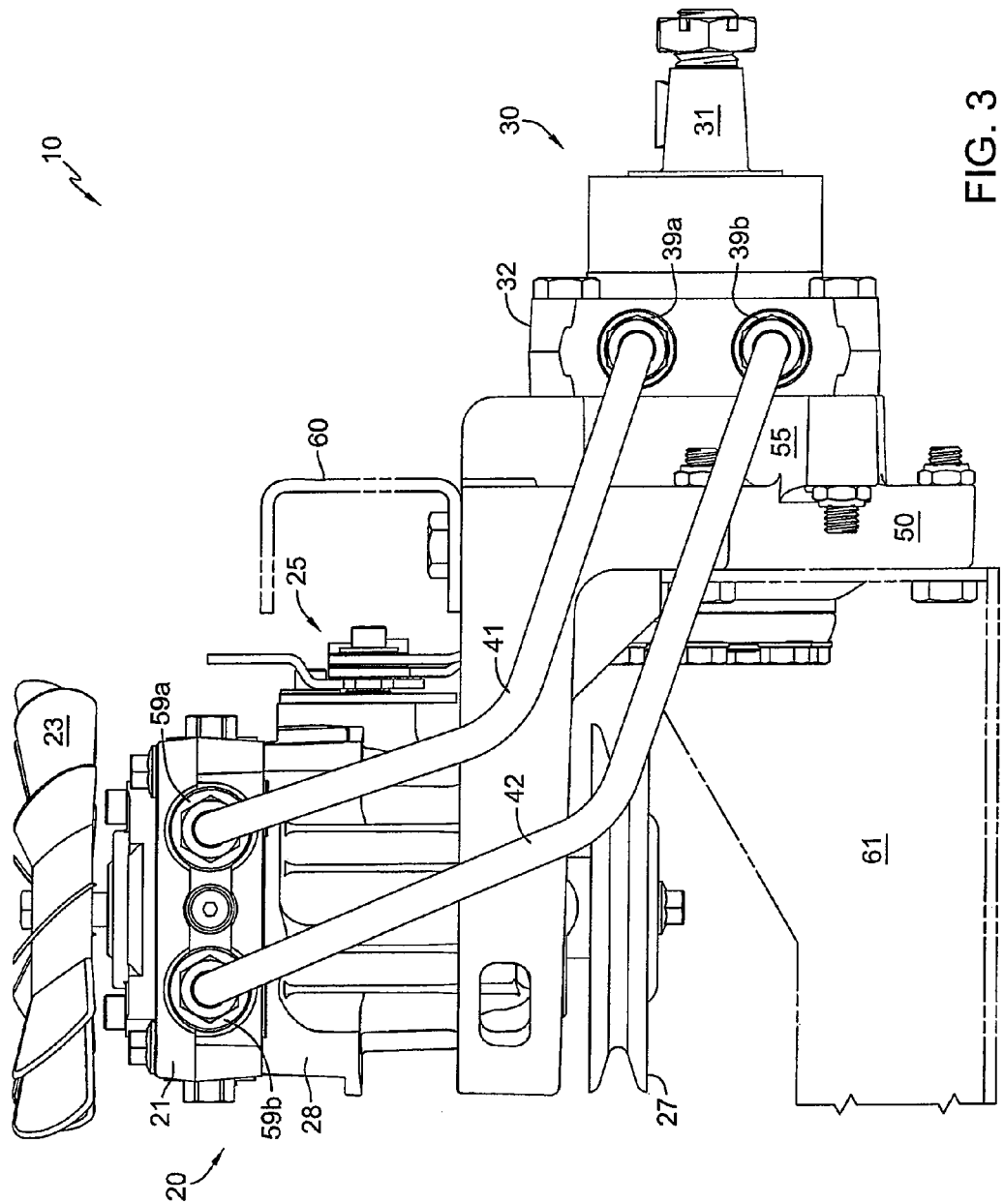
FIG. 3 is a side view of the embodiment of the present invention depicted in FIG. 1.

FIGS. 1-3 depict an embodiment of transmission assembly 10, which comprises pump assembly 20, motor assembly 30 and bracket 50. As noted above, transmission assembly 10 is intended to be mounted in a vehicle, which is not depicted herein but which a person or ordinary skill in the art would understand to include self-propelled machines such as a snow thrower, lawn and garden tractors and similar applications. In FIG. 3, one can see portions of exemplary vehicle frame element 60 and cross-brace 61.

Figure 4:
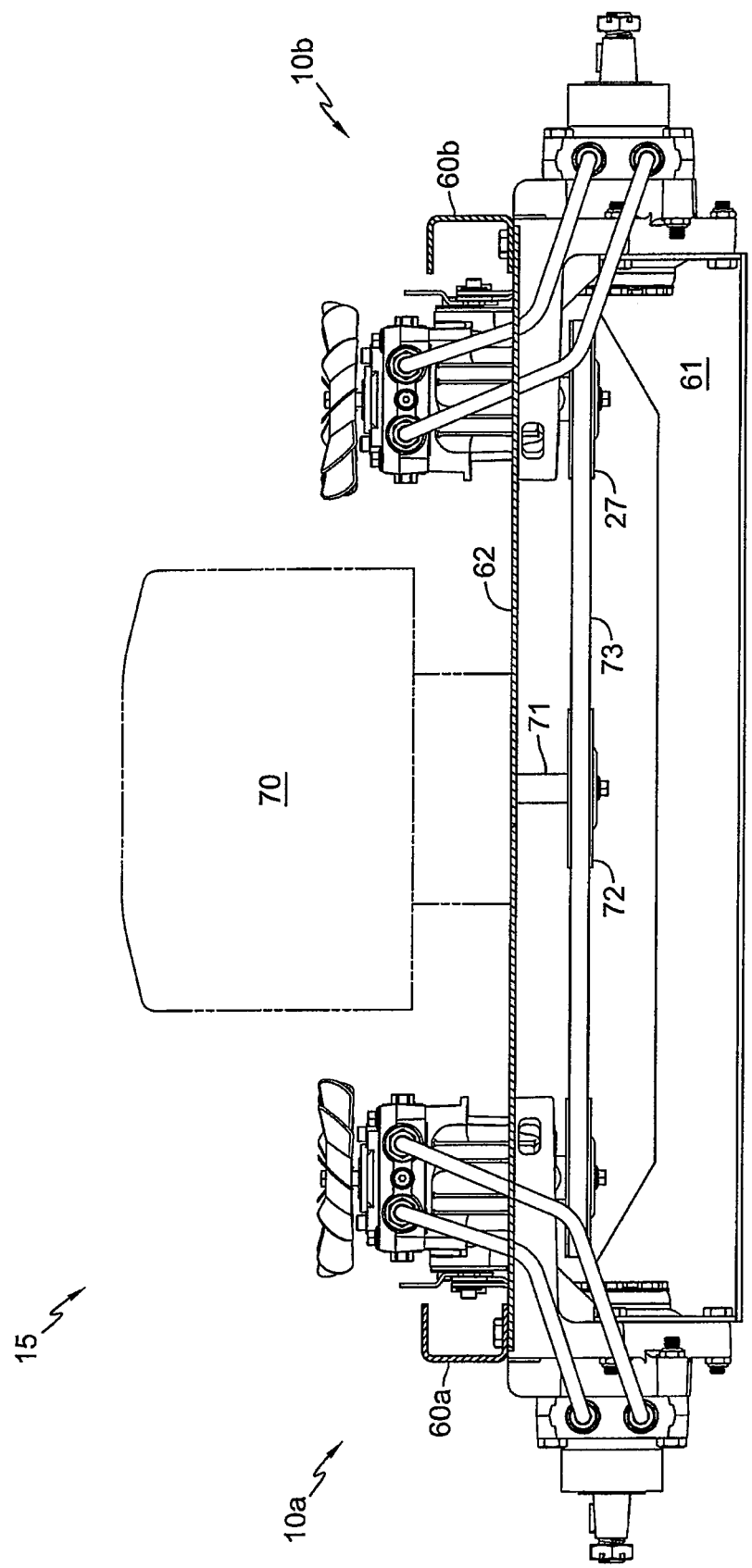
FIG. 4 is a rear elevational view of a vehicle incorporating a pair of transmission assemblies of the present invention.

In FIG. 4 one can see transmission assemblies 10a and 10b mounted to frame elements 60a and 60b, respectively, and cross-brace 61 in vehicle 15. Certain elements of vehicle 15, such as the drive wheels and the like, are not depicted simply for clarity, but one of ordinary skill in the art will understand that such additional elements are required. Prime mover/engine 70 is mounted on frame element 62. Engine output shaft 71 extends through frame element 62 and engine output pulley 72 is mounted on engine output shaft 71. Belt 73 cooperates with input pulley 27 and output pulley 72 to drive pump input shaft 22. A second output pulley (not shown) may be mounted on engine output shaft 71, for example, to provide power to a mower deck (not shown) via a separate belt (not shown).

Bracket 50 provides a location to mount both pump assembly 20 and motor assembly 30 within the vehicle. Bracket 50 comprises a pump mounting location 51, and a motor mounting location 52 formed generally perpendicular and adjacent to pump mounting location 51. The resulting right angle shape of bracket 50 allows for ease in manufacturing, assembly of transmission assembly 10, and installation in the vehicle. Moreover, this pre-assembly allows a user to easily configure the various components of transmission assembly 10 based on the needs of the particular vehicle. As can be seen in FIG. 2, pump mounting location 51 is located on a base 47, from which a peripheral wall 48 extends upwardly, terminating in an upper periphery 49.

Motor assembly 30 is mounted to bracket 50, proximate to motor mounting location 52, through a plurality of bolts 33. Each bolt 33 engages a hole 56 formed proximate to wall 55. Wall 55 is also formed proximate to motor mounting location 52 to aid in locating motor assembly 30 in the correct orientation and position on bracket 50 during assembly of the vehicle, and to aid in stabilizing and supporting motor assembly 30 during operation of the vehicle.

Pump assembly 20 is mounted to bracket 50 through a plurality of bolts 26 (only one shown for simplicity). Each bolt 26 engages a hole 54 formed on pump mounting location 51 and a corresponding flange on the external housing of pump assembly 20.

The scope of the present invention includes embodiments in which bracket 50 is engaged to the vehicle in any number of known ways. In the depicted embodiment, bracket 50 is engaged to vehicle frame element 60 and cross-brace 61.

Pump assembly 20 and motor assembly 30 can be of a type well known in the art of hydraulic transmissions and will only briefly be described herein. Pump assembly 20 typically includes a pump cylinder block (not shown) and a swash plate (not shown) to control the hydraulic output of the pump cylinder block. In the depicted embodiment, the pump is an axial piston pump which may be of the type described in U.S. Pat. No. 6,332,393, which is incorporated herein by reference in its entirety. Pump assembly 20 further comprises pump input shaft 22, which may be driven, either directly or indirectly, by a prime mover, such as an engine (not shown). In this embodiment, input pulley 27 is disposed on one end of pump input shaft 22 to provide a rotational force thereto, and fan 23 is mounted on an opposite end of pump input shaft 22. Pump assembly 20 further comprises an external housing, namely housing member 28 connected to pump end cap 21 to form a sump, where pump end cap 21 includes internal porting (not shown) in communication with the pump cylinder block. An external charge pump 29 may also optionally be disposed on an external surface of pump end cap 21 and connected to the internal porting.

Pump assembly 20 may optionally comprise a return to neutral assembly 25 such as is described in U.S. Pat. No. 6,782,797, the disclosure of which is incorporated in its entirety by reference herein. At least a portion of the return to neutral assembly is preferably exposed above the top of the pump mounting area of the bracket (with respect to the ground), as shown in FIGS. 1 and 3. However, it will be apparent to those skilled in the art that the scope of the present invention includes a pump assembly that may comprise any type of return to neutral assembly, and also includes those in which the pump assembly does not comprise a return to neutral assembly. The pump will also typically have a bypass mechanism, e.g., a bypass valve and third internal porting forming a shunt (not shown) in pump end cap 21 which will allow the hydraulic fluid to bypass the motor. Mechanical bypass designs are known in the art and are described in, for example, U.S. Pat. No. 5,010,733. When the bypass mechanism is activated, the vehicle can be free-wheeled.

In the depicted embodiment, motor assembly 30 typically comprises a geroller motor (partially shown). However, it will be apparent to those skilled in the art that the scope of the present invention includes embodiments in which motor assembly 30 comprises a different type of motor, such as a gerotor motor or an axial piston motor. In FIG. 2, motor assembly 30 has a rotor (not shown) and stator 34 of standard design. Output shaft 31 is driven by the rotor and is coupled to at least one wheel (not shown) of the vehicle. The manifold 38 and the geroller set (which includes stator 34 and the rotor) of motor assembly 30 are located between motor end cap 37 and front housing 32, which include internal porting (not shown).

External hoses 41 and 42 connect pump end cap 21 with motor front housing 32, to form a hydraulic circuit in combination with the first and second internal portings formed in pump assembly 20 and motor assembly 30, respectively. A pair of pump system ports 59a and 59b are provided to hydraulically connect pump assembly 20 to motor assembly 30, which in turn has its own motor system ports 39a and 39b. In the depicted embodiment, pump system ports 59a and 59b are located on pump end cap 21 while motor system ports 39a and 39b are formed in front housing 32, although other locations could be used for both sets. It is preferable for the mounting of hoses 41 and 42 that both sets of system ports be on the same side of transmission assembly 10.

It will be apparent to one of ordinary skill in the art that the vehicle may employ only one transmission assembly 10, or multiple transmission assemblies 10. Further it will be apparent to those of skill in the art that the scope of the present invention includes those embodiments in which multiple transmission assemblies 10 are employed and share a common reservoir, as well as those in which multiple transmission assemblies 10 are employed and each has a separate reservoir.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A modular transmission assembly, comprising:
   a bracket separably attachable to a vehicle frame, the bracket comprising a single pump mounting area, a first peripheral wall extending upwardly from and surrounding the pump mounting area, a single motor mounting area, and a second peripheral wall extending outwardly from the motor mounting area, wherein the motor mounting area is integrally formed with and generally perpendicular and adjacent to the pump mounting area;
   a single pump assembly engaged and fastened to the bracket proximate to the pump mounting area, the pump assembly comprising an end cap secured to a pump housing and having at least two pump system ports on one side of the end cap;
   a single motor assembly engaged and fastened to the bracket proximate to the motor mounting area, the motor assembly comprising a front housing disposed on a first side of the motor mounting area and comprising at least two motor system ports and an output shaft, and wherein a portion of the motor assembly extends through and is surrounded by the second peripheral wall on a second side of the motor mounting area that is opposite of the first side; and
   at least two hoses, each hose connecting one of the pump system ports to one of the motor system ports, to form a hydraulic circuit.

2. The modular transmission assembly of claim 1 wherein the pump assembly further comprises an axial piston pump having a pump input shaft extending from the pump housing.

3. The modular transmission assembly of claim 2, further comprising a fan driven by the pump input shaft.

4. The modular transmission assembly of claim 1 wherein the motor assembly further comprises a geroller motor.

5. The modular transmission assembly of claim 1 further comprising a return to neutral assembly engaged to the pump assembly.

6. The modular transmission assembly of claim 5, wherein at least a portion of the return to neutral assembly is exposed above the top of the pump mounting area of the bracket.

7. A modular transmission assembly comprising:
   a bracket comprising a pump mounting area and a motor mounting area, wherein the motor mounting area is formed generally perpendicular to the pump mounting area;
   a peripheral wall extending upwardly from the bracket and surrounding the pump mounting area;

an pump assembly engaged and fastened to the bracket proximate to the pump mounting area, the pump assembly comprising a pump housing having at least two pump system ports open to an external surface thereof and a pump input shaft extending into the pump housing;

a motor assembly engaged and fastened to the bracket proximate to the motor mounting area, the motor assembly comprising a motor housing comprising at least two motor system ports open to the external surface thereof and a motor output shaft;

at least two hoses connecting the pump assembly to the motor assembly, the at least two hoses connected to both the first and second internal porting to from a hydraulic circuit; and a return to neutral assembly engaged to the pump assembly, wherein a first portion of the return to neutral assembly is exposed above a top of the peripheral wall and a second portion of the return to neutral assembly is disposed below the top of the peripheral wall.

8. The modular transmission assembly of claim 7 further comprising a fan driven by the pump input shaft.

9. The modular transmission assembly of claim 7, wherein the pump housing further comprises a main housing element and an end cap secured thereto to form a sump, and the pump system ports are formed in the end cap.

10. A vehicle comprising a frame, a prime mover disposed on the frame, and at least two modular transmission assemblies separately disposed on the frame, each modular transmission assembly comprising:

a bracket comprising a single pump mounting area, a peripheral wall extending upwardly from the bracket and surrounding the pump mounting area, and a single motor mounting area, wherein the motor mounting area is integrally formed with and generally perpendicular to the pump mounting area;

a single pump assembly comprising a pump housing having at least two pump system ports on one side thereof;

a single motor assembly engaged and fastened to the bracket proximate to the motor mounting area, the motor assembly comprising a motor housing having at least two motor system ports and a motor output shaft; and at least two hoses, each hose connecting one of the pump system ports to one of the motor system ports, to form a hydraulic circuit.

11. The vehicle of claim 10, wherein each said pump assembly comprises an axial piston pump.

12. The vehicle of claim 10, wherein each said motor assembly further comprises a geroller motor.

13. The vehicle of claim 10, further comprising a separate return to neutral assembly engaged to each pump assembly.

14. The vehicle of claim 13, wherein a portion of each return to neutral assembly is exposed above the top of its respective bracket.

15. The vehicle of claim 14, wherein each modular transmission assembly further comprises a pump input shaft extending from the pump housing and a fan driven by the pump input shaft.

16. The vehicle of claim 10, wherein each pump housing further comprises a main housing element and an end cap secured thereto to form a sump.

17. The vehicle of claim 16, wherein the pump system ports of each pump assembly are formed in the respective end cap.

\* \* \* \* \*